(12) United States Patent
Kim et al.

(10) Patent No.: US 8,233,108 B2
(45) Date of Patent: Jul. 31, 2012

(54) LIQUID CRYSTAL DISPLAY

(75) Inventors: Taewoo Kim, Paju-si (KR); Seungwoo Son, Paju-si (KR); Wonkeun Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 107 days.

(21) Appl. No.: 12/501,081

(22) Filed: Jul. 10, 2009

(65) Prior Publication Data

US 2010/0214505 A1 Aug. 26, 2010

(30) Foreign Application Priority Data

Feb. 23, 2009 (KR) .................. 10-2009-0014695

(51) Int. Cl.
*G02F 1/1333* (2006.01)
(52) U.S. Cl. ......................................... 349/58; 349/161
(58) Field of Classification Search .................. 349/161; 362/218
See application file for complete search history.

(56) References Cited

U.S. PATENT DOCUMENTS 7,223,003 B2 * 5/2007 Kim .............................. 362/561

FOREIGN PATENT DOCUMENTS

CN 1643437 A 7/2005

OTHER PUBLICATIONS

Office Action issued in corresponding Chinese Patent Application No. 200910140083.3, mailed Jul. 29, 2011.

* cited by examiner

*Primary Examiner* — Richard Kim
(74) *Attorney, Agent, or Firm* — Brinks Hofer Gilson & Lione

(57) ABSTRACT

A liquid crystal module includes: a liquid crystal display panel; a backlight unit that irradiates light onto the liquid crystal display panel; a panel guide that supports the liquid crystal display panel and the backlight unit in a stacked condition and ensures a panel gap between the liquid crystal display panel and the backlight unit; and a top case facing the panel guide. The panel guide includes one or more ventilation openings that penetrate side walls of the panel guide facing the panel gap.

5 Claims, 13 Drawing Sheets

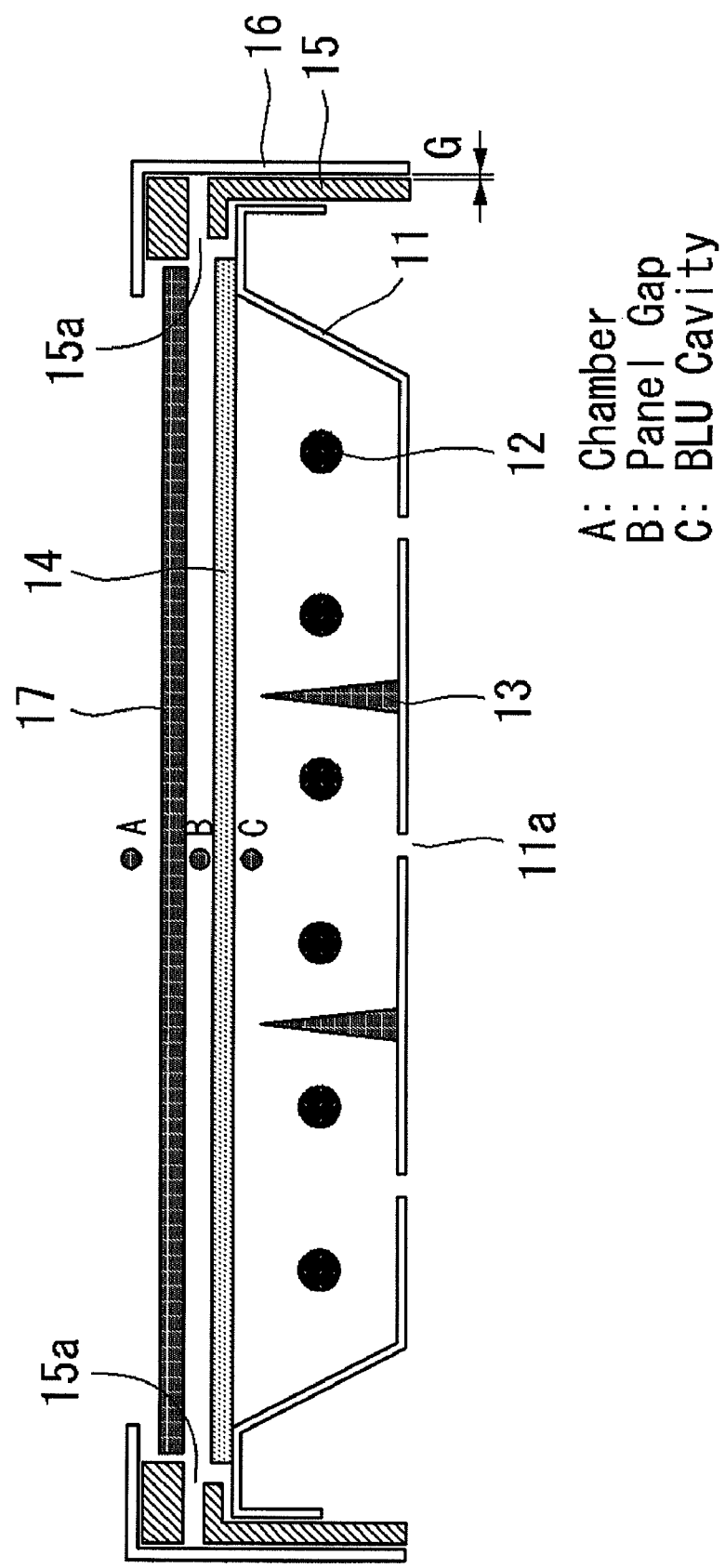

LIQUID CRYSTAL DISPLAY

RELATED APPLICATIONS

This application claims the benefit of Korean Patent Application No. 10-2009-0014695 filed on Feb. 23, 2008, the entire contents of which is incorporated herein by reference for all purposes as if fully set forth herein.

BACKGROUND

1. Field

This disclosure relates to a liquid crystal module including a backlight unit and a guide/case member.

2. Related Art

In recent years, various flat panel displays are developed which are capable of reducing weight and volume which are disadvantages of a cathode ray tube (CRT). Such a flat panel display includes a liquid crystal display LCD, a field emission display FED, a plasma display panel PDP, an electro luminescence display EL, and the like.

The liquid crystal display is being more widely applied due to its characteristics of lightness, thinness, low power consumption driving, etc. Accordingly, the liquid crystal display has been used in a portable computer such as a notebook personal computer (PC), an office automation device, an audio/video device, an indoor/outdoor advertisement display device, etc. The LCD displays an image by controlling an electric field applied to a liquid crystal cell in response to video data and modulating light incident from a backlight unit BLU.

The liquid crystal display includes a liquid crystal display panel for displaying liquid crystal module video data and a backlight unit for irradiating light onto the liquid crystal display panel. The liquid crystal display panel and the backlight unit are implemented as a liquid crystal module by being assembled in a stacked condition.

The liquid crystal module further includes a guide/case member for fixing the liquid crystal display panel and the backlight unit and a driving circuit board of the liquid crystal display panel. In the liquid crystal module, there exist a panel gap corresponding to a space portion between the liquid crystal display panel and the backlight unit. Also, there exist a backlight unit (BLU) cavity such as cavity portions in which lamps are accommodated. While the panel gap is substantially enclosed or semi-enclosed, the backlight unit cavity is of an outside air ventilation structure. Due to such a structure of the liquid crystal module, when the liquid crystal module is exposed to rapid temperature and humidity changes, the liquid crystal panel is deformed due to a large difference in humidity between the panel gap and the backlight unit cavity. As a result, the luminance of an image displayed on the liquid crystal panel becomes nonuniform.

BRIEF SUMMARY

A liquid crystal module includes: a liquid crystal display panel; a backlight unit that irradiates light onto the liquid crystal display panel; a panel guide that supports the liquid crystal display panel and the backlight unit in a stacked condition and ensures a panel gap between the liquid crystal display panel and the backlight unit; and a top case facing the panel guide. The panel guide includes one or more ventilation openings that penetrate side walls of the panel guide facing the panel gap.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9a is a cross-sectional view of the liquid crystal module taken along line A-A in FIG. 8;

DETAILED DESCRIPTION OF THE DRAWINGS AND THE PRESENTLY PREFERRED EMBODIMENTS

Figure 1:
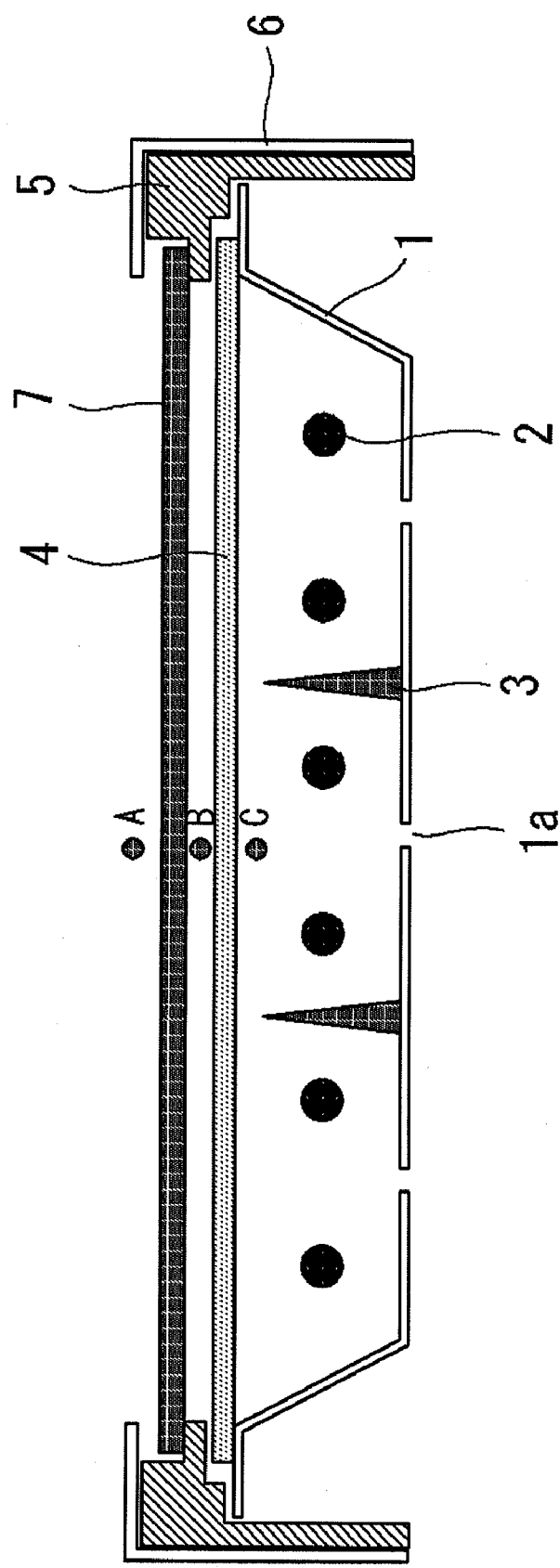
FIG. 1 is a cross-sectional view showing a liquid crystal module having a panel gap substantially enclosed therein.

Other advantages and features of the present invention will become apparent from the following description of an exemplary embodiment referring to the drawings.

Hereinafter, an implementation of this disclosure will be described in detail with reference to FIGS. 1 to 12.

A method for manufacturing a liquid crystal display device includes a liquid crystal display panel substrate cleaning process, a substrate patterning process, an alignment film forming/rubbing process, a substrate bonding and liquid crystal dropping process, a drive circuit mounting process, a test process, a repair process, and a liquid crystal module assembling process In the substrate cleaning process, contaminated impurities are removed with a cleaning solution from surfaces of upper and lower glass substrates of a liquid crystal display panel. The substrate patterning process includes a process of forming and patterning various thin film materials, such as signal lines including data lines and gate lines, thin film transistors TFTs, pixel electrodes, etc. on the lower glass substrate, and a process of forming and patterning various thin film materials, such as a black matrix, color filters, common electrodes, etc. on the upper glass substrate. In the alignment film forming/rubbing process, an alignment film is coated on the glass substrates, and the alignment film is rubbed with a rubbing cloth or optically aligned. Through this series of processes, formed on the lower glass substrate of the liquid crystal display panel is a pixel and TFT array including data lines for supplying video data voltages, gate lines that cross the data lines and to which scan signals, i.e., gate pulses are supplied, TFTs formed at the crossings of the gate lines and the data lines, pixel electrodes of respective liquid crystal cells coupled to the TFTs, and storage capacitors. A shift register of a gate drive circuit for generating scan signals may be formed simultaneously with the pixel and TFT array in the substrate patterning process. A black matrix, color filters, and common electrodes are formed on the upper glass substrate of the liquid crystal display panel. In a vertical electric field driving system such as a twisted nematic (TN) mode or a vertical alignment (VA) mode, the common electrodes are formed on the upper glass substrate. On the other hand, in a horizontal electric field driving system such as an in-plane switching (IPS) mode or a fringe field switching (FFS) mode, the common electrodes are formed on the lower glass substrate together with the pixel electrodes. Polarizers are attached to the upper and lower glass substrates, respectively, and a polarizer and a protective film are attached thereon.

In the substrate bonding and liquid crystal dropping process, a sealant is drawn on any one of the upper and lower glass substrates of the liquid crystal display panel, and liquid crystal is dropped onto the other substrate. The dropping of liquid crystal onto the lower glass substrate will be described by taking an example in which a UV-hardening sealant is formed on the upper glass substrate, the upper glass substrate with the sealant is overturned and fixed to an upper stage, and the lower glass substrate with the liquid crystal dropped thereon is fixed to a lower stage. Next, in the substrate bonding and liquid crystal dropping process, the upper glass substrate and the lower glass substrate are aligned, and then a vacuum pump is driven to apply pressure to one of the upper and lower glass substrates in a vacuum state and bond the upper glass substrate and the lower glass substrate. At this time, a cell gap of the liquid crystal layer is larger than a cell gap of a design value. Next, when nitrogen N2 is applied and the pressure is adjusted to atmospheric pressure, the cell gap is adjusted to the design value by a pressure difference between the pressure in the bonded glass substrates and an external atmospheric pressure. In this state, in the substrate bonding and liquid crystal dropping process, a UV light source is turned on to irradiate UV rays to the sealant through the upper glass substrate to harden the sealant.

In the drive circuit mounting process, an integrated circuit IC of a data drive circuit is mounted on the lower glass substrate of the liquid crystal display panel by using a COG (Chip On Glass) process or a TAB (Tape Automated Bonding) process. The gate drive circuit may be formed on the lower glass substrate of the liquid crystal display panel as described above, or may be formed on the lower glass substrate by the TAB process in the drive circuit mounting process. Next, in the drive circuit mounting process, the integrated circuit IC and a PCB (printed circuit board) are connected by a FPC (Flexible Printed Circuit board) or a FFC (Flexible Flat Cable).

The test process includes a test of the integrated circuit, a test of the signal lines including the data lines and gate lines formed on the lower glass substrate, a test to be performed after the formation of the pixel electrodes, a test to be performed after the substrate bonding and liquid crystal dropping process, and a turn-on test. In the repair process, a recovery process is performed on signal line defects and TFT defects that are identified as being repairable.

Through this series of processes, the liquid crystal display panel is completed. As described above, the liquid crystal display panel includes a liquid crystal display panel having liquid crystal sandwiched between the upper glass substrate and the lower glass substrate, polarizers attached to the upper and lower surfaces of the liquid crystal display panel, and various circuit parts for connecting data and gate drive ICs to the data lines and gate lines of the liquid crystal display panel.

In the liquid crystal module assembling process, a protective film attached to the liquid crystal display panel is peeled off, and then the liquid crystal display panel is assembled on an assembled backlight unit by using a guide/case member. The backlight unit of the present invention may be implemented as an edge type backlight unit or a direct type backlight unit shown in FIG. 1. A lamp, such as a cold cathode fluorescent lamp (CCFL) and an external electrode fluorescent lamp (EEFL), or a light emitting diode (LED) may be selected as a light source of the backlight unit. The light source may be comprised of a combination of a lamp and a light emitting diode. The inverter is a power driving circuit for turning on the light source.

Figure 2:
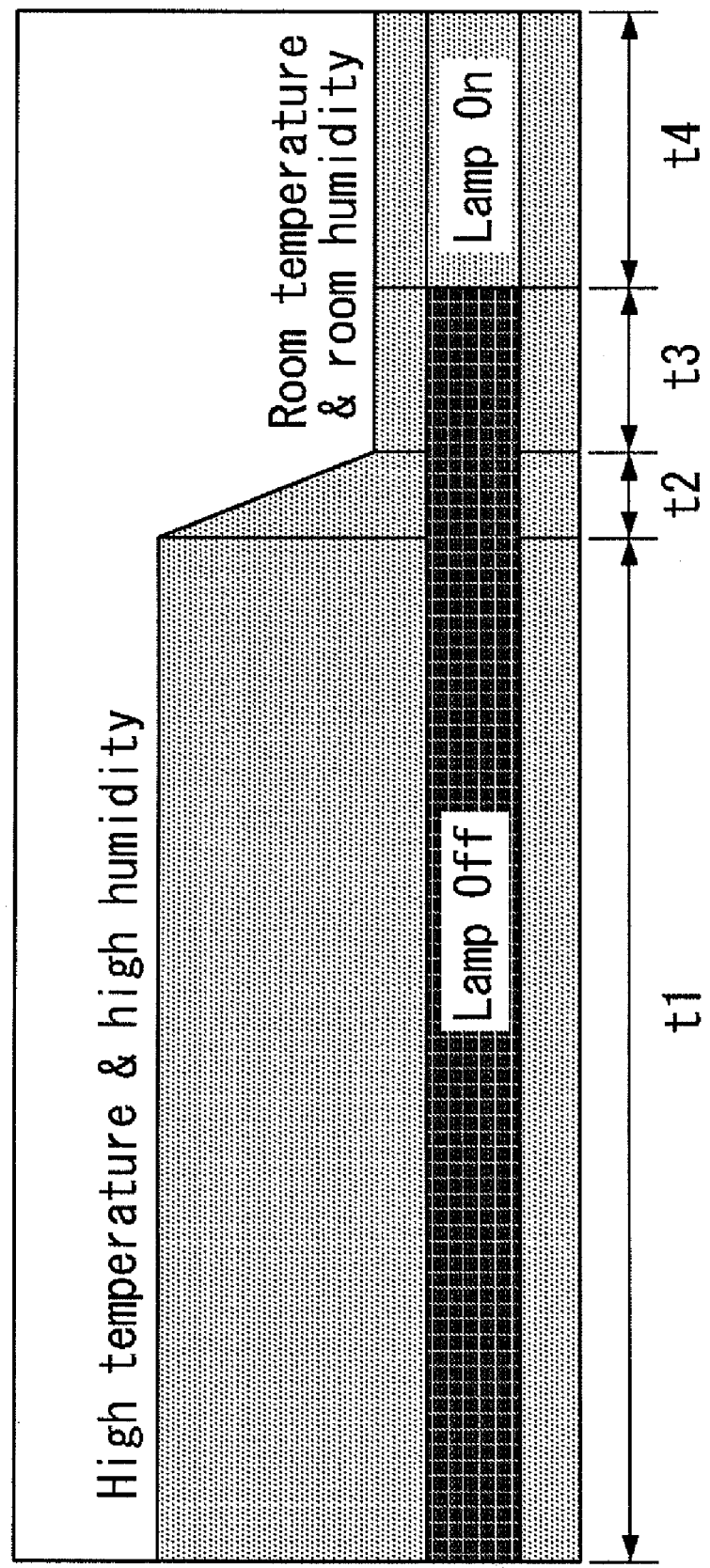
FIG. 2 is a graph showing a test condition for detecting the driving characteristics of the liquid crystal module in a high-temperature and high-humidity environment and a room-temperature and room-humidity environment.
Figure 3:
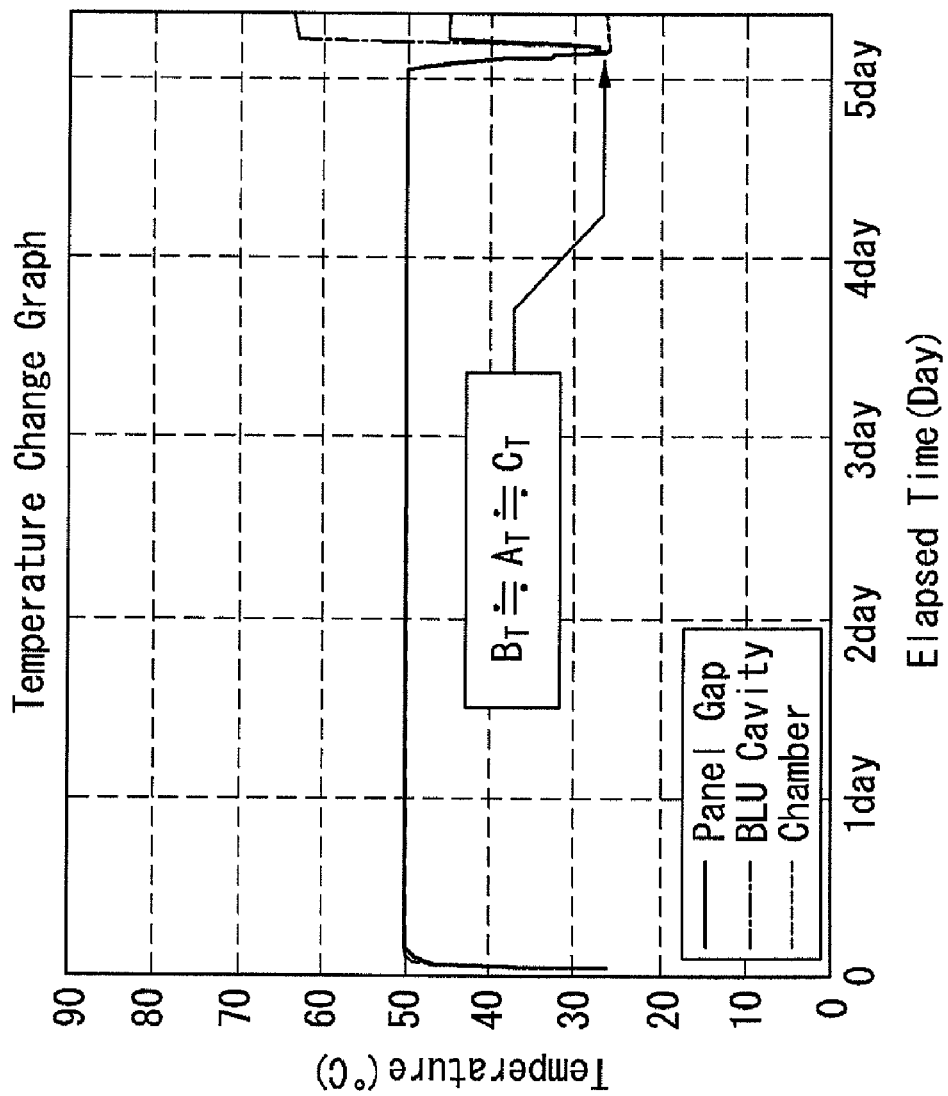
FIG. 3 is a graph showing temperature changes in cavity portions in the liquid crystal module and an outside environment in the test of FIG. 2.

In the present disclosure, after the assembling of the liquid crystal module, a test as shown in FIG. 2 can be carried out in order to detect changes in the performance of the liquid crystal module according to temperature and humidity changes.

FIG. 1 illustrates one example of a liquid crystal module including a direct type backlight unit, a liquid crystal display panel, and a guide/case member.

Referring to FIG. 1, the direct type backlight unit includes a bottom cover 1 accommodating light sources 2 and a diffusion plate and optical sheets 4 stacked on the bottom cover 1. A reflection sheet for reflecting light from the light sources 2 may be adhered to inner bottom and side surfaces of the bottom cover 1 facing the light sources 2. A plurality of light sources 2 are arranged in a backlight unit cavity C prepared by the bottom cover 1. The bottom cover 1 may be provided with a plurality of ventilation openings 1*a*, and also may be provided with a diffusion plate supporter 3 for supporting the diffusion plate from below and preventing the diffusion plate from dropping down. The diffusion plate includes beads and diffuses light from the light sources 2. The optical sheets include one or more prism sheets and one or more diffusion sheets, and diffuses light incident from the diffusion plate and refract the traveling path of the light to an angle substantially perpendicular to a light incident surface of the liquid crystal display panel.

The guide/case member includes a panel guide 5, a top case 6, and the like. The panel guide 5 includes a stepped surface facing sides of the liquid crystal display panel 7 and sides of the backlight unit so as to surround the upper edge and sides of the liquid crystal display panel 7 and the sides of the backlight unit. The stepped portion of the panel guide 5 supports the liquid crystal display panel 7 from below and ensures a panel gap B between the liquid crystal display panel 7 and the diffusion plate and optical sheets 4. The top case 6 has a structure which surrounds the upper surface and sides of the panel guide 5.

In the present invention, the test as shown in FIG. 2 can be carried out, by which the driving characteristics of the liquid crystal module can be detected in an environment where temperature and humidity are rapidly changed by keeping the liquid crystal module for a long time in a chamber of high temperature and high humidity and then performing a turn-on test back in a room-temperature/room-humidity environment. The temperature/humidity test of FIG. 2 includes a process of keeping the liquid crystal display module in a high-temperature and high-humidity chamber for a time period t1 of approximately 120~240 hrs, a process of taking out the liquid crystal module from the high-temperature and high-humidity chamber and lowering the temperature and humidity of the liquid crystal module for a time period t2 of approximately 0.5 hrs, a process of exposing the liquid crystal module to an environment of room temperature and room humidity for a time period t3 of approximately 2 hrs, and a process of turning on the light sources 2 in the environment of room temperature and room humidity.

Figure 4:
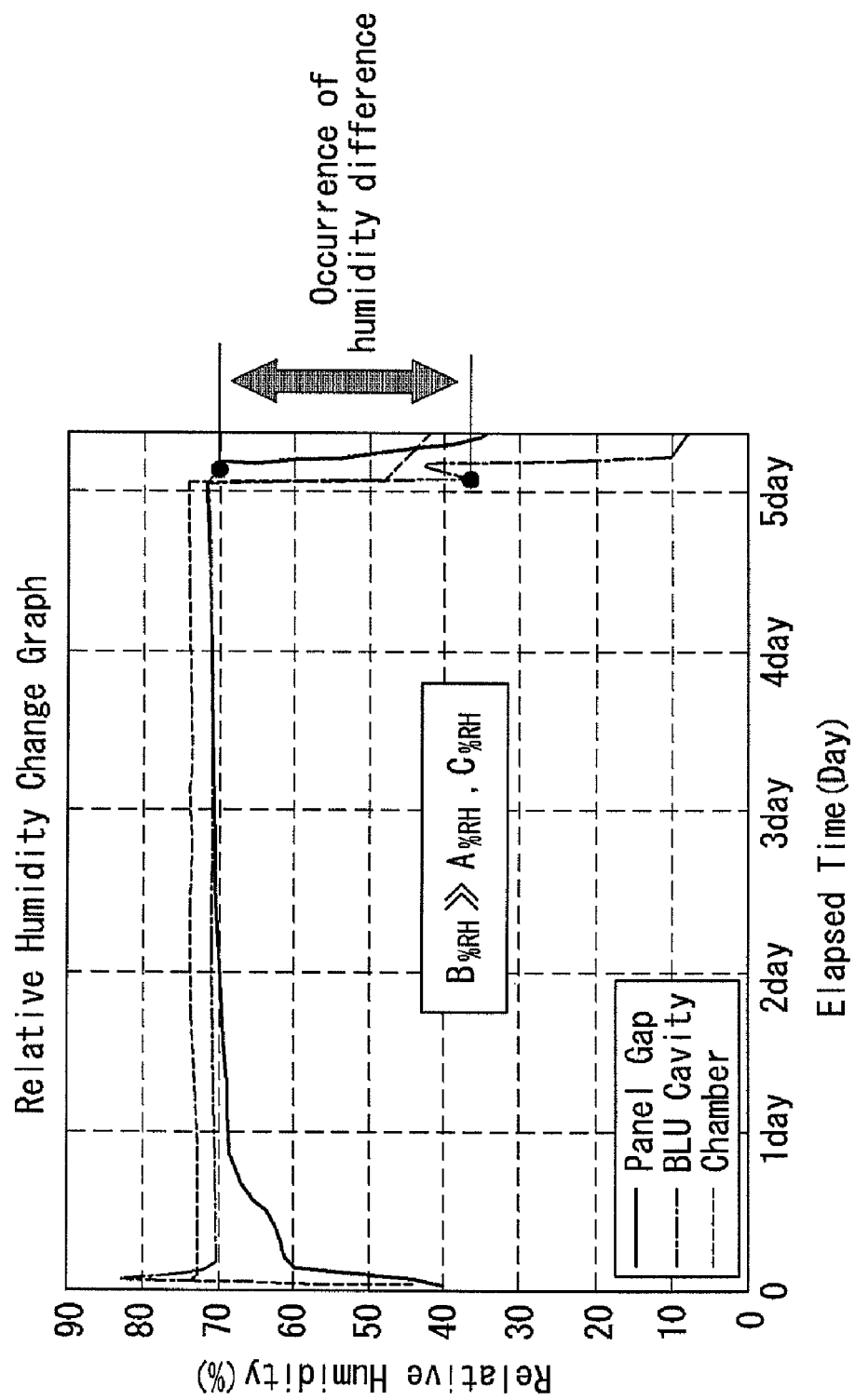
FIG. 4 is a graph showing humidity changes in the cavity portions in the liquid crystal module and the outside environment in the test of FIG. 2.

The liquid crystal module is exposed to a high temperature of 50° C. and a high humidity of 80% RH for the time period t1, and exposed to a room temperature of 25° C. and a room humidity of 50% RH for the times periods t2 to t4. In this test, as a result of measuring the temperature of the cavity portions B and C in the liquid crystal module and the temperature of an outside environment A where the liquid crystal module is placed for the time periods t1 to t4, it was found that, as in FIG. 3, the cavity portions B and C in the liquid crystal module and the outside environment were similar in temperature during those time periods. On the contrary, as a result of measuring humidity changes of the cavity portions B and C in the liquid crystal module and the outside environment for the same time length, it was found that, as shown in FIG. 4, there was a large difference between the humidity of the panel gap B, which is a cavity portion substantially enclosed or semi-enclosed in the liquid crystal module, and the humidity of the cavity portion C of the backlight unit and the outside environment. Especially, the difference became wider for the time periods t2 and t3 which are immediately after the liquid crystal module was taken out from the high-temperature and high-humidity chamber and exposed to the room temperature/room humidity environment.

Figure 5:
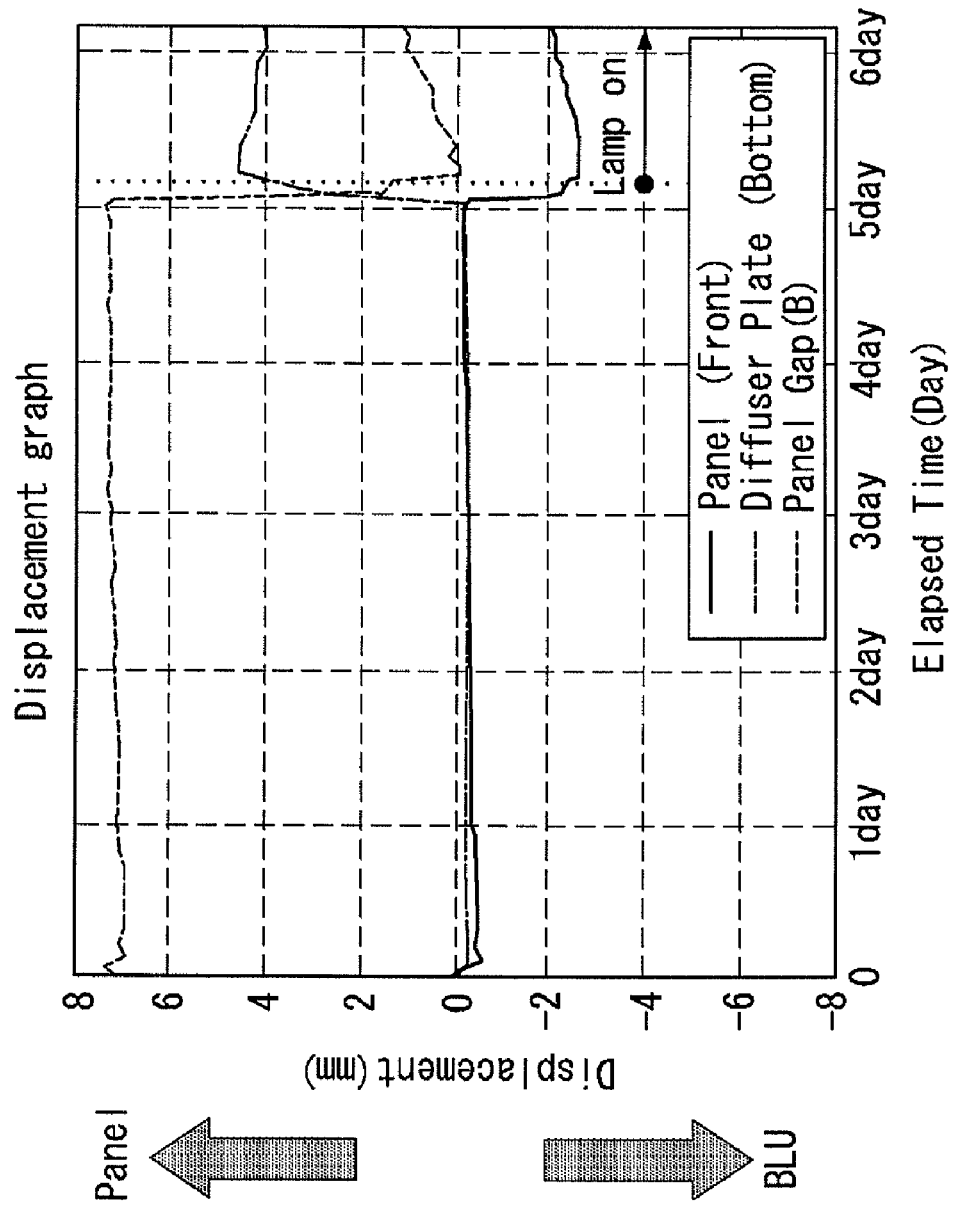
FIG. 5 is a graph showing displacement changes of respective parts of the liquid crystal module in the test of FIG. 2.
Figure 6:
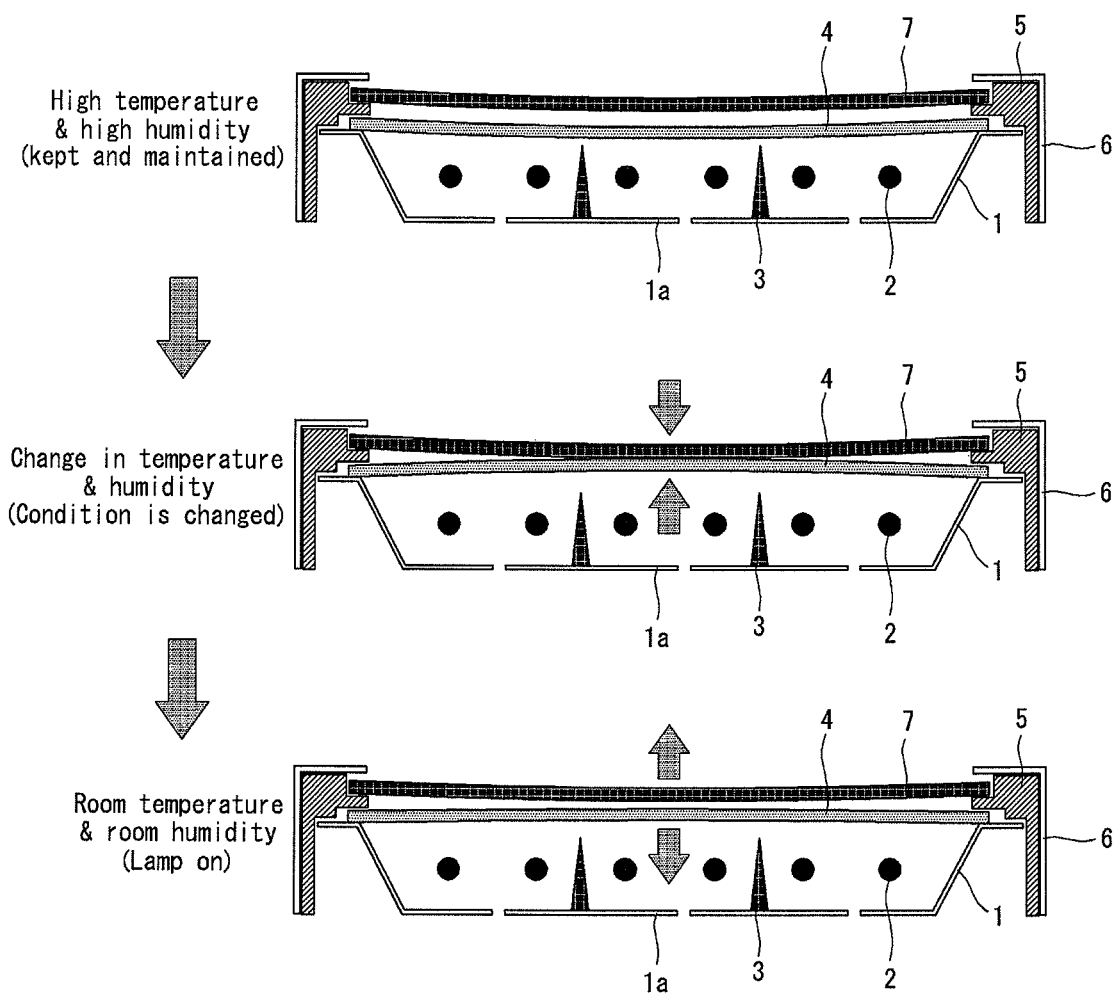
FIG. 6 is a cross-sectional view showing displacement changes of the respective parts of the liquid crystal module in the test of FIG. 2.
Figure 7:
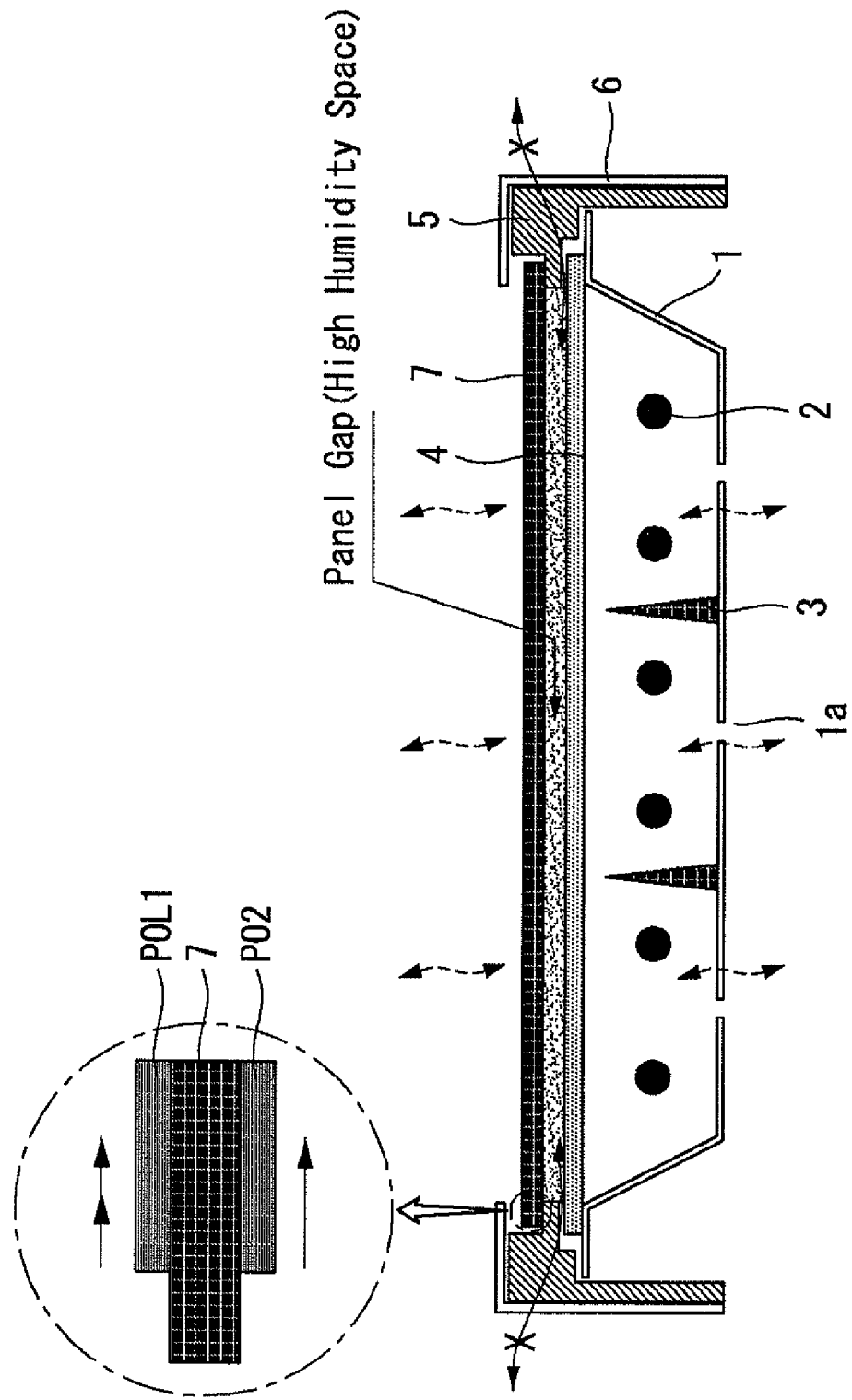
FIG. 7 is a view schematizing a humidity difference between the cavity portions on the inside and a resultant difference in the contraction amounts of polarizers.

The humidify difference between the cavity portions in the liquid crystal module as shown in the above test is caused by the structure of the backlight unit. In other words, while the panel gap B is a substantial enclosed space in which it is difficult to perform a humidity exchange with the cavity portion C of the backlight unit or the outside environment A, the backlight unit cavity portion C has an open structure which is connected to the outside environment A through the ventilation openings 1a. Therefore, when the surrounding environment of the liquid crystal module changes from the high-temperature and high-humidity environment to the room-temperature and room-humidity environment, the humidity of the panel gap B becomes higher than the humidity of the backlight unit cavity portion C and the outside environment A. Such a humidity difference generates a displacement of the liquid crystal display panel 7 as shown in FIGS. 5 to 7. Referring to FIGS. 5 to 7, when the environment of the liquid crystal module changes from the high-temperature and high-humidity environment to the room-temperature and room-humidity environment, the contraction amount of the upper polarizer POL1 of the liquid crystal display panel 7 is relatively larger than the contraction amount of the lower polarizer POL2, and this causes the center portion of the liquid crystal display panel 7 to be bent toward the backlight unit. On the other hand, the center portion of the diffusion plate and optical sheet of the backlight unit is convexly bent toward the liquid crystal display panel 7. As a result, the panel gap B is not constant, and becomes narrower toward the center portion of the liquid crystal display panel 7, thereby deteriorating the surface uniformity of light irradiated to the liquid crystal display panel 7.

FIGS. 8 to 12 show exemplary embodiments of a liquid crystal module having a structure in which no humidity difference is generated in the liquid crystal module even with temperature and humidity changes.

Figure 8:
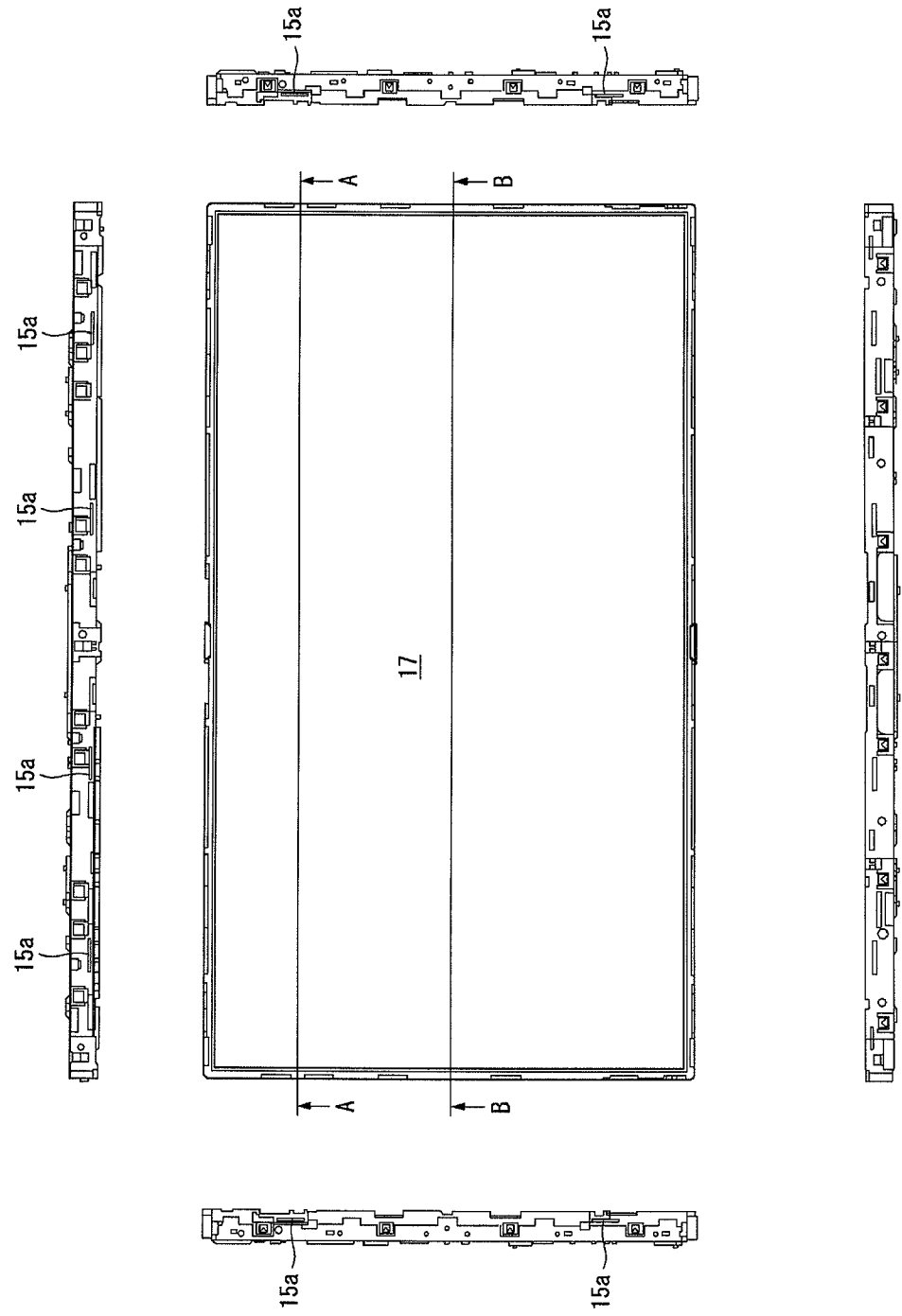
FIG. 8 is a view showing front and side views of a liquid crystal display module according to a first exemplary embodiment of the present invention.
Figure 9B:
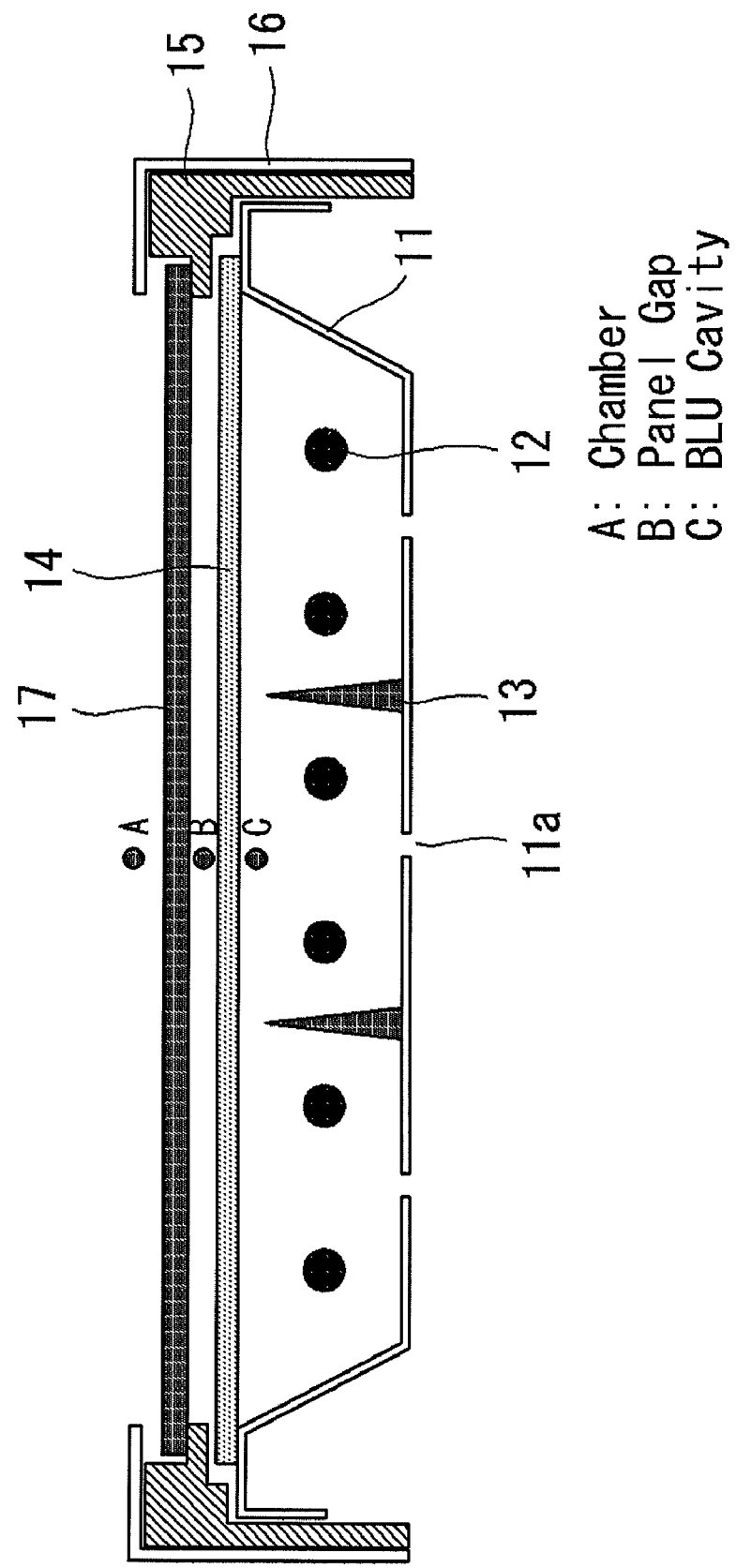
FIG. 9b is a cross-sectional view of the liquid crystal module taken along line B-B in FIG. 8.
Figure 10:
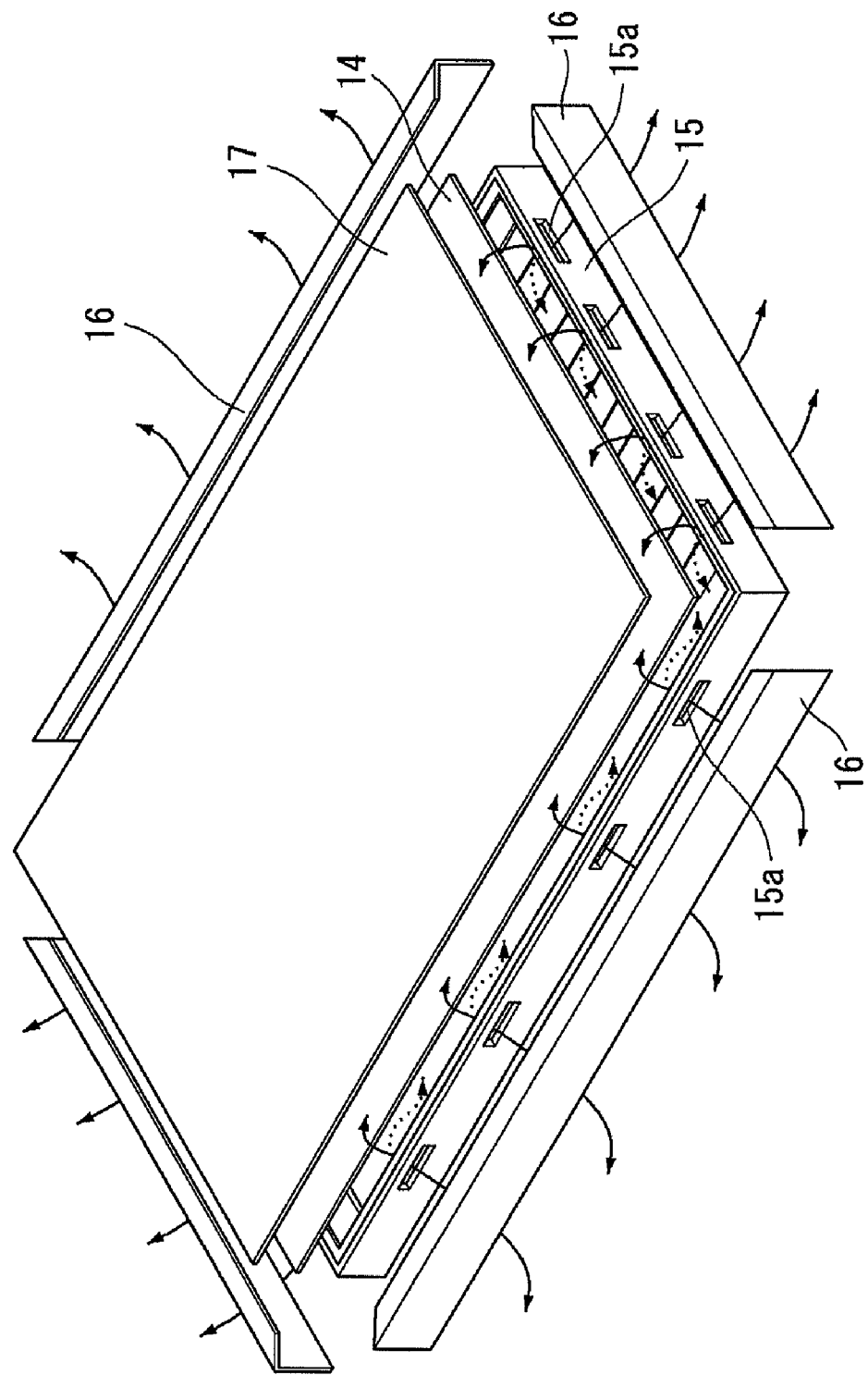
FIG. 10 is an exploded perspective view of the liquid crystal module showing the flow of air and moisture between a panel gap of the liquid crystal module shown in FIG. 8 and an outside environment.

Referring to FIGS. 8 to 10, the liquid crystal display module according to a first exemplary embodiment of the present invention includes a liquid crystal display panel 17, a backlight unit, a panel guide 15, and a top case 16.

Data lines, gate lines crossing the data lines, TFTs formed at the crossings of the gate lines and the data lines, pixel electrodes coupled to the TFTs, and storage capacitors are formed on a lower glass substrate of the liquid crystal display panel 17. A black matrix, color filters, and common electrodes are formed on an upper glass substrate of the liquid crystal display panel 17. In a vertical electric field driving system such as a twisted nematic (TN) mode or a vertical alignment (VA) mode, the common electrodes are formed on the upper glass substrate. On the other hand, in a horizontal electric field driving system such as an in-plane switching (IPS) mode or a fringe field switching (FFS) mode, the common electrodes are formed on the lower glass substrate together with the pixel electrodes. Polarizers are attached to the upper and lower glass substrates of the liquid crystal display panel 17, and an alignment film for setting a pre-tilt angle of liquid crystals are formed on an interface which is in contact with the liquid crystals. The liquid crystal display panel 17 applicable in the present invention may be implemented as any liquid crystal modes, as well as the above-stated TN mode, VA mode, IPS mode, and FFS mode.

A driving circuit board(s) is connected to the liquid crystal display panel 17. The driving circuit board includes a data driving circuit for converting digital video data into analog video data voltages by using a gamma compensation voltage and supplying them to the data lines, a gate driving circuit for sequentially supplying scan pulses to the gate lines, and a timing controller for supplying digital video data to the data drive circuit and controlling the operation timing of the data driving circuit and the gate driving circuit.

The backlight unit includes a bottom cover 11 accommodating light sources 12 and a diffusion plate and optical sheet 14 stacked on the bottom cover 11, and uniformly irradiates light to the liquid crystal display panel. A reflection sheet for reflecting light from the light sources 12 may be adhered to inner bottom and side surfaces of the bottom cover 11 facing the light sources 12. A plurality of light sources 12 are arranged in a backlight unit cavity C prepared by the bottom cover 11. The bottom cover 11 may be provided with a plurality of ventilation openings 11a, and also may be provided with a diffusion plate supporter 13 for supporting the diffusion plate from below and preventing the diffusion plate from dropping down. The diffusion plate includes beads and diffuses light from the light sources 12. The optical sheets include one or more prism sheets and one or more diffusion sheets, and diffuses light incident from the diffusion plate and refract the traveling path of the light to an angle substantially perpendicular to a light incident surface of the liquid crystal display panel 17. The backlight unit of the present invention is not limited to the illustrated direct type backlight unit, but may be implemented as any backlight unit in which a panel gap and a backlight unit cavity are present.

The panel guide 15 is a four-corner rectangular mold frame having glass fibers incorporated into synthetic resin, such as polycarbonate, and includes a stepped surface facing sides of the liquid crystal display panel 17 and sides of the backlight unit so as to surround the upper edge and sides of the liquid crystal display panel 17 and the sides of the backlight unit. The stepped portion of the panel guide 15 supports the liquid crystal display panel 17 from below and ensures a panel gap B between the liquid crystal display panel 17 and the diffusion plate and optical sheets 14. One or more ventilation openings 15a for flowing air between the panel gap B and the outside environment are formed at the respective four corners of the panel guide 15. As shown in FIG. 10, the panel gap B is connected to the outside environment A through the ventilation openings 15a of the panel guide 15 and a gap G between the panel guide 15 and the top case 16. The gap G between the panel guide 15 and the top case 16 is a void of 0.2 mm~1 mm. Accordingly, air and moisture can flow between the panel gap B and the outside environment A via the ventilation openings 15a of the panel guide 15 and the gap G between the panel guide 15 and the top case 16. The ventilation openings 15a of the panel guide 15 and the gap G between the panel guide 15 and the top case 16 serve to adjust the temperature and humidity of the panel gap B similarly to those of the outside environment A upon rapid temperature and humidity changes of the liquid crystal module.

The top case 16 is made of a metal material, such as a zinc-plated steel plate, and has a structure surrounding the upper surface and sides of the panel guide 15.

Figure 11:
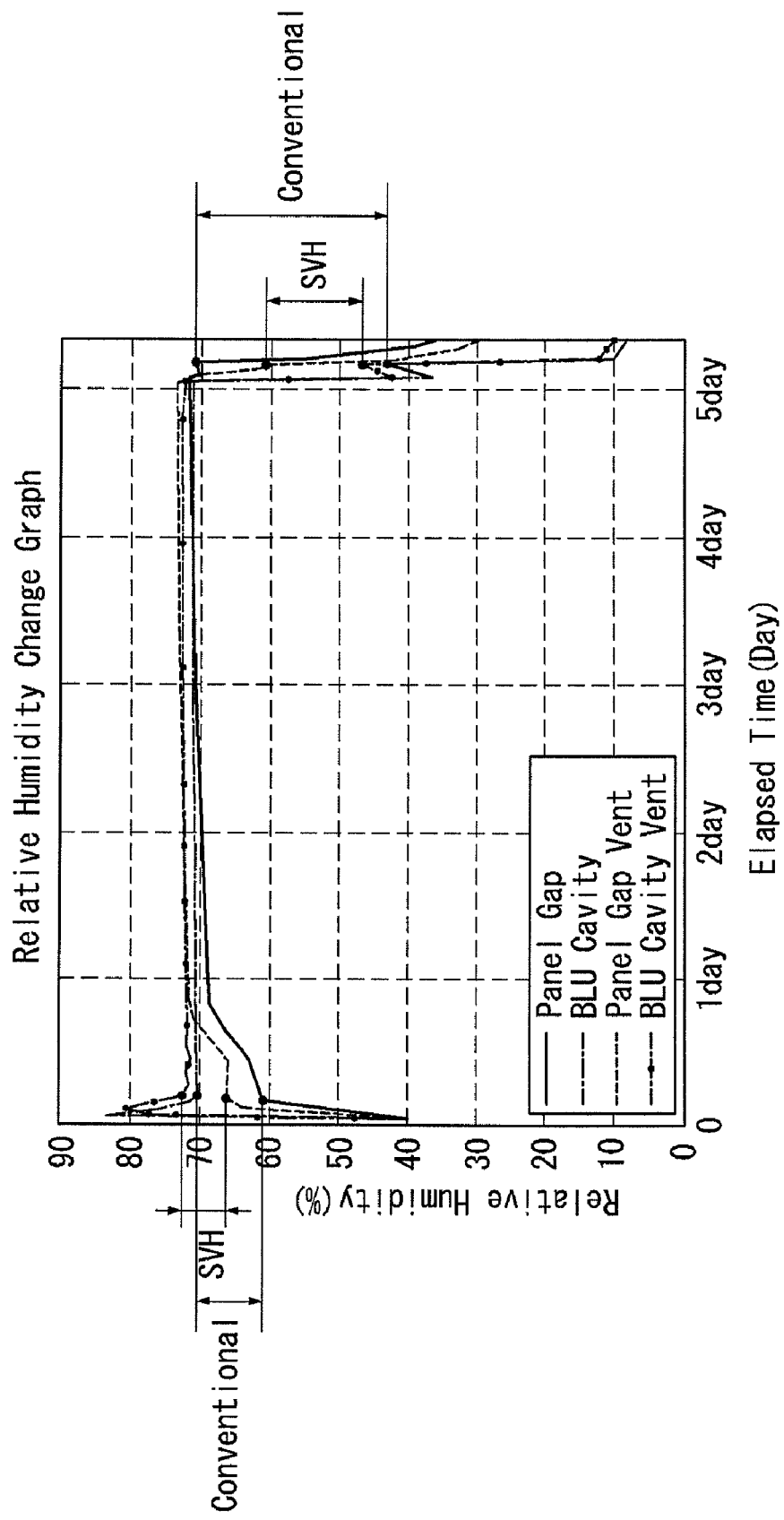
FIG. 11 is a graph showing results of a comparison test of humidity changes between a conventional liquid crystal module having an enclosed panel gap and a liquid crystal module shown in FIGS. 8 to 10 having an open panel gap.

FIG. 11 is a graph showing results of a comparison test of humidity changes between a conventional liquid crystal module having an enclosed panel gap and a liquid crystal module shown in FIGS. 8 to 10 having an open panel gap. The conditions of this test are as shown in FIG. 2. The liquid crystal module of FIGS. 8 to 10 is implemented by a gap having an open structure in which the panel gap B is connected to the outside environment A by means of the ventilation openings 15a formed on the panel guide 15. As a result, in the test as shown in FIG. 2, when the liquid crystal module is taken out from the high-temperature and high-humidity chamber and exposed to a room temperature/room humidity environment to thus rapidly change the temperature and humidity of the liquid crystal module, the difference in humidity between the panel gap B and the cavity C of the backlight unit can be reduced. In FIG. 11, "SVH" indicates a humidity difference between the panel gap B and the cavity C of the backlight unit in the liquid crystal module shown in FIGS. 8 to 10, and "conventional" indicates a humidity difference between the panel gap and the cavity of the backlight unit in a conventional liquid crystal module having an enclosed panel gap in which no ventilation openings are formed on a panel guide. As can be seen from FIG. 11, when ventilation openings 15a connected to the outside environment A are formed on the sides of the panel guide 15, the humidity of the panel gap B can be lowered and the humidity difference between the panel gap B and the cavity C of the backlight unit can be reduced compared to the conventional liquid crystal module.

Figure 12:
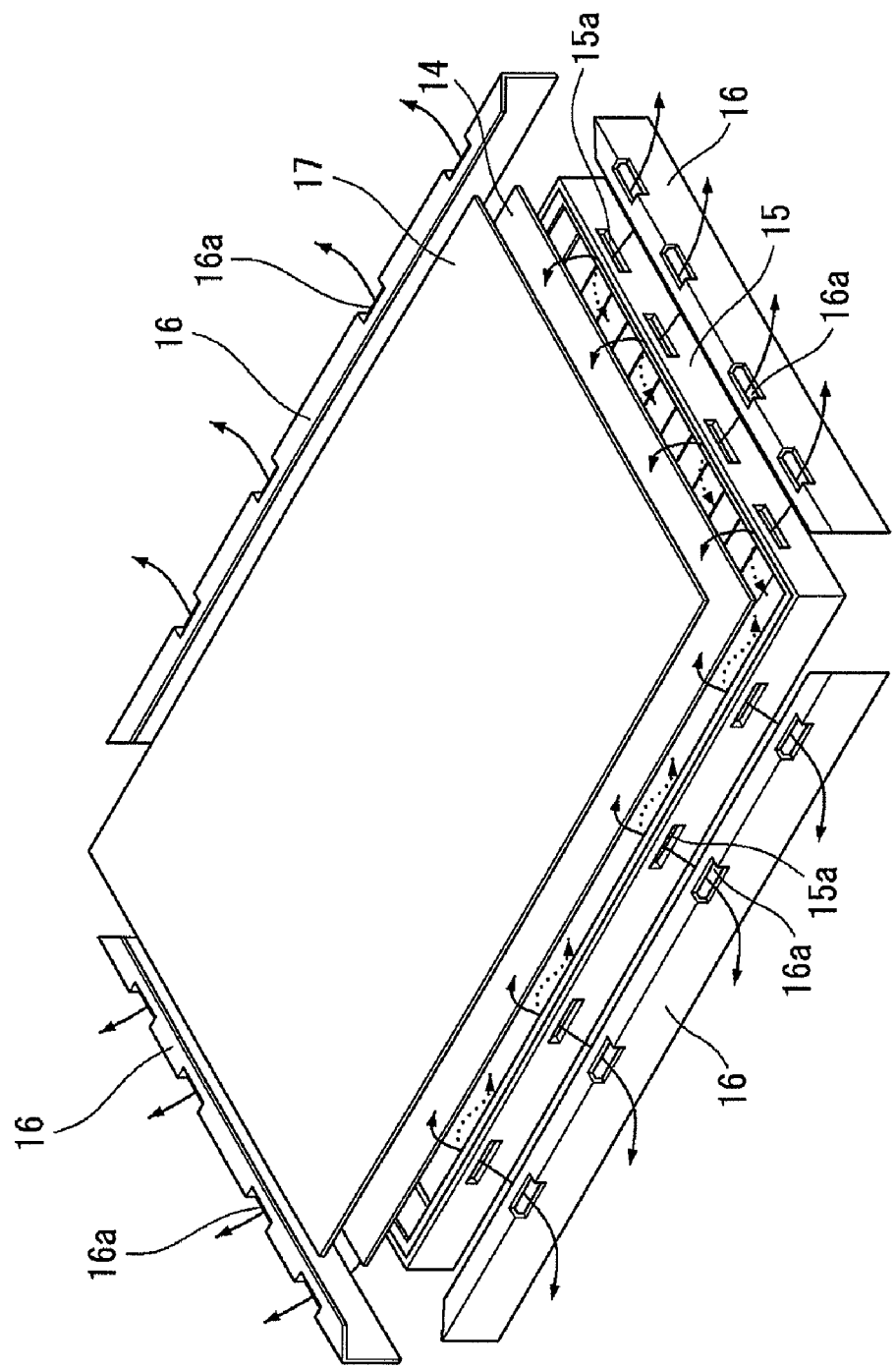
FIG. 12 shows a liquid crystal module according to a second exemplary embodiment.

FIG. 12 shows a liquid crystal module according to a second exemplary embodiment of the present invention.

Referring to FIG. 12, the liquid crystal module according to the second exemplary embodiment of the present invention includes a liquid crystal display panel 17, a backlight unit, a panel guide 15, and a top case 16. In this exemplary embodiment, the liquid crystal display panel, the backlight unit, and the panel guide 15 are substantially identical to those of the first exemplary embodiment shown in FIGS. 8 to 10, so a detailed description thereof will be omitted.

The top case 16 is made of a metal material, such as a zinc-plated steel plate, and has a structure surrounding the upper surface and sides of the panel guide 15. The top case 16 is provided with ventilation openings 16a facing the ventilation openings 15a of the panel guide 15, respectively. The ventilation openings 16a may be formed by chamfering the top case 16. A panel gap B is connected to an outside environment A through the ventilation openings 15a of the panel guide 15 and the ventilation openings 16a of the top case 16. Accordingly, air and moisture can flow between the panel gap B and the outside environment A through the ventilation openings 15a of the panel guide 15 and the ventilation openings 16a of the top case 16. The ventilation openings 16a of the panel guide 15 and the ventilation openings 16a of the top case 16 serve to adjust the temperature and humidity of the panel gap B similarly to those of the outside environment A upon rapid temperature and humidity changes of the liquid crystal module.

Meanwhile, different methods from the above-described exemplary embodiments, such as a method of forming ventilation openings on the diffusion plate and optical sheets 14 and a method of forming ventilation openings on glass substrates of the liquid crystal display panel 17, may be considered as another method for communicating between the panel gap B and the backlight unit cavity C. However, these methods are less practical because of high costs and low reliability. For example, if ventilation openings are formed on the diffusion plate, the unit prices of the parts may rise due to additional costs incurred by the formation of the ventilation openings. More over, the diffusion plate is made of a plastic material of polycarbonate (PC), polylstyrene (PS), and polymethyl methacylate/styrene copolymer (MS) at a thickness of 1 mm~2 mm, and is weak to vibration or shock in terms of thickness of material characteristics. Thus, when vibration or shock is applied to the diffusion plate, the diffusion plate may be easily damaged in the vicinity of the ventilation openings. The method of forming ventilation openings on glass substrates of the liquid crystal display panel is not possible with the current processing technology. Further, when ventilation openings are formed on the diffusion plate, the optical sheets, and the glass substrates of the liquid crystal display panel, this causes a light leakage phenomenon whereby bright light is observed from the periphery of the display surface due to the light not diffused through the ventilation openings.

As described in detail above, the liquid crystal module according to the exemplary embodiments of the present invention minimizes a humidity difference between the panel gap and the ventilation openings of the backlight unit when exposed to rapid changes of temperature and humidity by having the ventilation openings formed on the panel guide or on the panel guide and the top case, respectively, the ventilation openings enabling exchange of air and moisture between the panel gap and the outside environment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal module, comprising:
   a liquid crystal display panel;
   a backlight unit that irradiates light onto the liquid crystal display panel and has a optical sheet at the topmost position;
   a panel guide that supports the liquid crystal display panel and the backlight unit in a stacked condition and ensures a panel gap between the liquid crystal display panel and the optical sheet; and
   a top case facing the panel guide, wherein the panel guide includes one or more ventilation openings that penetrate side walls of the panel guide facing the panel gap, and that are configured to flow air between the panel gap and an outside environment.

2. The liquid crystal display of claim 1, wherein the backlight unit comprises:

a bottom cover having a space portion that accommodates a plurality of light sources; and a diffusion plate and a plurality of optical sheets stacked on the bottom cover to cover the space portion and arranged under the liquid crystal display panel.

3. The liquid crystal display of claim 1, wherein the panel gap communicates with the outside environment through the ventilation openings of the panel guide and a gap between the panel guide and the top case.

4. The liquid crystal display of claim 1, wherein the top case is provided with ventilation openings facing the ventilation openings of the panel guide.

5. The liquid crystal display of claim 1, wherein the panel gap communicates with the outside environment of the liquid crystal module via the ventilation openings of the panel guide and the ventilation openings of the top case.

* * * * *